(12) United States Patent
Baksh et al.

(10) Patent No.: US 8,551,217 B2
(45) Date of Patent: *Oct. 8, 2013

(54) SIX BED PRESSURE SWING ADSORPTION PROCESS OPERATING IN NORMAL AND TURNDOWN MODES

(75) Inventors: Mohamed S. A. Baksh, Wheatfield, NY (US); Marian Simo, Kenmore, NY (US)

(73) Assignee: Praxair Technology, Inc., Danbury, CT (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/185,099

(22) Filed: Jul. 18, 2011

(65) Prior Publication Data
US 2013/0019750 A1  Jan. 24, 2013

Related U.S. Application Data

(63) Continuation-in-part of application No. 13/004,706, filed on Jan. 11, 2011, now Pat. No. 8,491,704.

(51) Int. Cl.
B01D 53/047 (2006.01)

(52) U.S. Cl.
USPC ............................................................. 95/96

(58) Field of Classification Search
USPC .............. 95/96, 117, 127, 130, 139, 140, 143
See application file for complete search history.

(56) References Cited

U.S. PATENT DOCUMENTS

| | | | |
|---|---|---|---|
| 3,430,418 A | 3/1969 | Wagner | |
| 3,564,816 A | 2/1971 | Batta | |
| 3,986,849 A | 10/1976 | Fuderer et al. | |
| 4,077,779 A | 3/1978 | Sircar et al. | |
| 4,234,322 A * | 11/1980 | De Meyer et al. | 95/19 |
| 4,259,091 A | 3/1981 | Benkmann | |
| 4,299,595 A | 11/1981 | Benkmann et al. | |
| 4,299,596 A | 11/1981 | Benkmann | |
| 4,333,744 A | 6/1982 | Fuderer | |
| 4,340,398 A | 7/1982 | Doshi et al. | |
| 4,371,380 A | 2/1983 | Benkmann | |
| 4,381,189 A | 4/1983 | Fuderer | |
| 4,402,712 A * | 9/1983 | Benkmann | 95/98 |
| 4,468,237 A | 8/1984 | Fuderer | |
| 4,475,929 A | 10/1984 | Fuderer | |
| 4,482,361 A | 11/1984 | Whysall | |

(Continued)

FOREIGN PATENT DOCUMENTS

| | | |
|---|---|---|
| EP | 0620035 A1 | 10/1994 |
| EP | 1 219 337 A2 | 7/2002 |

(Continued)

OTHER PUBLICATIONS

J. A.C. Silva and A. E. Rodrigues. Analysis of ZLC Technique for Diffusivity Measurements in Bidisperse Porous Adsorbent Pellets. Gas. Sep. Purif., vol. 10, No. 4, pp. 207-224, 1996.

*Primary Examiner* — Frank Lawrence, Jr.
(74) *Attorney, Agent, or Firm* — Iurie A. Schwartz

(57) ABSTRACT

The present invention relates to a six bed pressure swing adsorption (PSA) system utilizing new and advanced cycles to obtain enhanced hydrogen recovery from a hydrogen containing feed gas (i.e., synthesis gas). In one such cycle each of the six beds has four pressure equalization steps, and at least one of the beds is receiving and processing said feed gas to obtain a hydrogen product gas (i.e., a 6-1-4 cycle).

14 Claims, 4 Drawing Sheets

(56) References Cited

U.S. PATENT DOCUMENTS

| | | |
|---|---|---|
| 4,499,208 A | 2/1985 | Fuderer |
| 4,512,780 A | 4/1985 | Fuderer |
| 4,553,981 A | 11/1985 | Fuderer |
| 4,640,694 A | 2/1987 | Leitgeb et al. |
| 4,650,500 A | 3/1987 | Patel |
| 4,693,730 A | 9/1987 | Miller et al. |
| 4,726,816 A | 2/1988 | Fuderer |
| 4,732,578 A | 3/1988 | Benkmann |
| 4,761,165 A | 8/1988 | Stöcker et al. |
| 4,834,780 A | 5/1989 | Benkmann |
| 4,957,514 A | 9/1990 | Golden et al. |
| 4,964,888 A | 10/1990 | Miller |
| 5,012,037 A | 4/1991 | Doshi et al. |
| 5,051,115 A | 9/1991 | Leitgeb et al. |
| 5,174,796 A | 12/1992 | Davis et al. |
| 5,203,888 A | 4/1993 | Maurer |
| 5,258,056 A | 11/1993 | Shirley et al. |
| 5,294,247 A | 3/1994 | Scharpf et al. |
| 5,518,526 A | 5/1996 | Baksh et al. |
| 5,529,607 A | 6/1996 | Tan |
| 5,565,018 A | 10/1996 | Baksh et al. |
| 5,726,118 A | 3/1998 | Ivey et al. |
| 5,730,003 A | 3/1998 | Nguyen et al. |
| 5,733,359 A | 3/1998 | Doong et al. |
| 5,735,938 A | 4/1998 | Baksh et al. |
| 5,753,010 A | 5/1998 | Sircar et al. |
| 5,858,068 A | 1/1999 | Lansbarkis et al. |
| 5,912,422 A | 6/1999 | Bomard et al. |
| 6,007,606 A | 12/1999 | Baksh et al. |
| 6,027,549 A | 2/2000 | Golden et al. |
| 6,183,539 B1 | 2/2001 | Rode et al. |
| 6,210,466 B1 | 4/2001 | Whysall et al. |
| 6,221,492 B1 | 4/2001 | Moreau et al. |
| 6,261,343 B1 | 7/2001 | Golden et al. |
| 6,293,998 B1 | 9/2001 | Dolan et al. |
| 6,302,943 B1 | 10/2001 | Johnson et al. |
| 6,315,818 B1 | 11/2001 | Monereau |
| 6,340,382 B1 | 1/2002 | Baksh et al. |
| 6,379,430 B1 | 4/2002 | Monereau |
| 6,379,431 B1 | 4/2002 | Xu et al. |
| 6,402,813 B2 | 6/2002 | Monereau et al. |
| 6,425,939 B1 | 7/2002 | Moreau et al. |
| 6,454,838 B1 | 9/2002 | Xu et al. |
| 6,475,265 B1 | 11/2002 | Baksh et al. |
| 6,483,001 B2 | 11/2002 | Golden et al. |
| 6,500,235 B2 | 12/2002 | Zhong et al. |
| 6,503,299 B2 | 1/2003 | Baksh et al. |
| 6,514,317 B2 | 2/2003 | Hirano et al. |
| 6,527,831 B2 | 3/2003 | Baksh et al. |
| 6,530,975 B2 | 3/2003 | Rode et al. |
| 6,565,627 B1 | 5/2003 | Golden et al. |
| 6,565,628 B2 | 5/2003 | Xu et al. |
| 6,632,766 B2 | 10/2003 | Kanazirev |
| 6,699,307 B1 | 3/2004 | Lomax, Jr. |
| 6,733,568 B2 | 5/2004 | De-Souza et al. |
| 6,743,745 B2 | 6/2004 | Jaussaud et al. |
| 6,783,750 B2 | 8/2004 | Shah et al. |
| 6,814,787 B2 | 11/2004 | Golden et al. |
| 6,843,831 B2 | 1/2005 | Van de Kleut et al. |
| 6,849,106 B2 | 2/2005 | Le Bec |
| 6,866,699 B2 | 3/2005 | MacDowall et al. |
| 6,893,483 B2 | 5/2005 | Golden et al. |
| 6,916,358 B2 | 7/2005 | Nakamura et al. |
| 6,918,948 B2 | 7/2005 | Jaussaud et al. |
| 6,923,844 B2 | 8/2005 | Urakami et al. |
| 6,955,711 B2 | 10/2005 | Kawai et al. |
| 7,025,801 B2 | 4/2006 | Monereau |
| 7,025,804 B2 | 4/2006 | Simmons et al. |
| 7,037,485 B1 | 5/2006 | Drnevich et al. |
| 7,041,271 B2 | 5/2006 | Drnevich et al. |
| 7,137,257 B2 | 11/2006 | Drnevich et al. |
| 7,166,151 B2 | 1/2007 | Baksh et al. |
| 7,169,210 B2 | 1/2007 | Baksh et al. |
| 7,179,324 B2 | 2/2007 | Baksh et al. |
| 7,255,727 B2 | 8/2007 | Monereau et al. |
| 7,255,840 B2 | 8/2007 | Papavassiliou et al. |
| 7,276,107 B2 | 10/2007 | Baksh et al. |
| 7,294,172 B2 | 11/2007 | Baksh et al. |
| 7,300,497 B2 | 11/2007 | Urakami et al. |
| 7,300,899 B2 | 11/2007 | Weston et al. |
| 7,306,651 B2 | 12/2007 | Cieutat et al. |
| 7,395,670 B1 | 7/2008 | Drnevich et al. |
| 7,396,387 B2 | 7/2008 | Baksh et al. |
| 7,399,341 B2 | 7/2008 | Patel et al. |
| 7,404,846 B2 | 7/2008 | Golden et al. |
| 7,427,368 B2 | 9/2008 | Drnevich |
| 7,452,407 B2 | 11/2008 | Golden et al. |
| 7,467,519 B2 | 12/2008 | Raybold et al. |
| 7,500,999 B2 | 3/2009 | Aaron et al. |
| 7,517,390 B2 | 4/2009 | Lang |
| 7,537,742 B2 | 5/2009 | Baksh et al. |
| 7,588,742 B2 | 9/2009 | Haik-Beraud et al. |
| 7,594,955 B2 | 9/2009 | Ishihara |
| 7,628,842 B2 | 12/2009 | Schwartz et al. |
| 7,628,843 B2 | 12/2009 | Monereau et al. |
| 7,632,476 B2 | 12/2009 | Shah et al. |
| 7,648,562 B2 | 1/2010 | Monereau et al. |
| 2001/0009125 A1* | 7/2001 | Monereau et al. ............... 95/117 |
| 2003/0015091 A1* | 1/2003 | Xu et al. ........................ 95/96 |
| 2005/0098034 A1* | 5/2005 | Gittleman et al. .............. 95/96 |
| 2009/0223371 A1 | 9/2009 | Nakao et al. |
| 2010/0242722 A1 | 9/2010 | Belanger et al. |

FOREIGN PATENT DOCUMENTS

| | | |
|---|---|---|
| EP | 1486245 A1 | 12/2004 |
| EP | 1 972 367 A1 | 9/2008 |
| WO | WO02096539 A1 | 12/2002 |

\* cited by examiner

SIX BED PRESSURE SWING ADSORPTION PROCESS OPERATING IN NORMAL AND TURNDOWN MODES

RELATED APPLICATIONS

This application is a continuation-in-part of prior U.S. application Ser. No. 13/004,706, filed Jan. 11, 2011 and now U.S. Pat. No. 8,491,704, which is incorporated herein by reference.

FIELD OF THE INVENTION

The present invention relates to a six bed pressure swing adsorption (PSA) system utilizing new and advanced cycles to obtain enhanced hydrogen recovery from a hydrogen containing feed gas (i.e., synthesis gas). In one such cycle each of the six beds has four pressure equalization steps, and at least one of the beds is receiving and processing said feed gas to obtain a hydrogen product gas (i.e., a 6-1-4 cycle). The six bed PSA system can be operated in a turndown mode where one or two beds are taken offline. The new five bed cycle includes three equalization steps, while at least one bed is in operation (i.e., a 5-1-3 cycle). The four bed cycle includes two equalization steps, while at least one bed is in operation. This turndown mode, achieves a reduction of less than four percent, and eight percent reduction, respectively, in hydrogen throughput. In addition, the invention relates to a novel adsorbent layering employed in the beds of the PSA.

BACKGROUND OF THE INVENTION

The need for high purity gasses, such as hydrogen, processed from effluents in the chemical process industries remain. These effluents are hydrogen containing feed mixtures gases (i.e., synthesis gases), from the likes of steam methane reforming of natural gas or naptha, catalytic reforming of hydrocarbons, isomerization processes, etc, which are routed to a PSA for further processing. This growing demand requires the need to develop highly efficient separation processes (e.g., PSA) for hydrogen ($H_2$) production from various feed mixtures. In order to obtain highly efficient PSA separation processes, both the capital and operating costs of the PSA system must be reduced. Some ways of reducing PSA system cost include a decrease in the adsorbent inventory, reduction in the number of PSA beds, and using advanced cycles in the PSA processes. The aforementioned ways of reducing the PSA system cost constitute the elements of the present invention.

Conventional PSA systems are well known for separating feed mixture gases which contain components with different adsorption characteristics. For example, in a typical PSA system, a multicomponent gas mixture is passed to at least one of multiple adsorption beds at an elevated pressure to adsorb at least one strongly sorbed component while at least one component passes through. In the case of hydrogen PSA, hydrogen is the most weakly adsorbed component which passes through the bed. At a defined time, the feed step is discontinued and the adsorption bed is co-currently depressurized in one or more steps, counter-currently purged in one or more steps and counter-currently blown down in one or more steps to permit essentially pure hydrogen product to exit the bed with a high recovery. The sequence of steps is not limited to the one stated above and a combination of two or more steps can be employed as a single step as well.

U.S. Pat. No. 4,834,780 is directed to six bed PSA system having one bed in operation of the 6-1-3 and 6-1-4 cycles, wherein the first number in the cycle refers to the total number of beds, the second number refers to the number of beds on the feed step at any instant, and the third number refers to the number of bed to bed equalization steps in the PSA cycle. Thus, 6-1-3 means a six bed PSA cycle having one bed on feed at any instant, and the PSA cycle contains three bed-to-bed equalization steps. This cycle is reproduced in Table 1, below.

TABLE 1

6-1-3 PSA cycle chart.

| Bed# | Step: 1 | 2 | 3 | 4 | 5 | 6 | 7 | 8 | 9 | 10 | 11 | 12 |
|---|---|---|---|---|---|---|---|---|---|---|---|---|
| 1 | A1 | A2/PP | E1 | E2 | E3 | PPG | BD | PG | E3' | E2' | E1' | PP |
| 2 | E1' | PP | A1 | A2/PP | E1 | E2 | E3 | PPG | BD | PG | E3' | E2' |
| 3 | E3' | E2' | E1' | PP | A1 | A2/PP | E1 | E2 | E3 | PPG | BD | PG |
| 4 | BD | PG | E3' | E2' | E1' | PP | A1 | A2/PP | E1 | E2 | E3 | PPG |
| 5 | E3 | PPG | BD | PG | E3' | E2' | E1' | PP | A1 | A2/PP | E1 | E2 |
| 6 | E1 | E2 | E3 | PPG | BD | PG | E3' | E2' | E1' | PP | A1 | A2/PP |

In accordance with the teachings of the 6-1-3 cycle, the PSA system delivers a continuous flow of PSA tail gas to a surge drum that removes fluctuations in the pressure, flowrates and compositions, prior to sending it to an upstream unit (e.g., SMR) for use (e.g., SMR burner fuel). However, the 6-1-4 cycle of the patent features a discontinuous PSA tail gas flow routed upstream via the surge drum. The discontinuous PSA tail gas flow can create fluctuations in the hydrogen plants.

U.S. Pat. No. 6,454,838, is directed to a modified 6-1-4 cycle to remove the undesired discontinuous PSA tail gas supply to the surge drum. However, the solution provided in this patent results in a PSA cycle having several idle steps. Specifically, a twenty four step cycle is described with four idle steps and overlapping fourth equalization and blowdown steps. Those skilled in the art would recognize that idle steps in the PSA cycle invariably result in degradation in PSA process performance (e.g., lower hydrogen recovery). In an alternative embodiment, U.S. Pat. No. 6,454,838 discloses a 6-1-4 PSA cycle wherein the PSA cycle consists of twenty four steps in the cycle (See Table 3) featuring the following: (1) overlapping provide purge and the fourth equalization step; (2) additional tank for the temporal storage of gas from the second equalization step; (3) no idle steps and (4) continuous off-gas flow. However, in this embodiment a storage tank is utilized in order to eliminate the four idle steps. Furthermore, the PSA process recovery drops by 1-1.5% for cycles utilizing a fourth equalization compared to the prior art 6-1-3 cycle. See Table 4.

U.S. Pat. No. 6,007,606, co-owned by the assignor of the present invention, discloses a PSA process involving the storage of products having various purities in segregated storage tanks for subsequent usage. Products of increasing purities, admitted at the product end of the bed are used during purging and re-pressurization steps. In addition, different composition streams collected at the feed end of the bed during the countercurrent depressurization step are admitted at the feed end of the bed, in the order of increasing product component content during the rising pressure step(s).

In addition to the cycles, the related art discusses conventional adsorbent materials utilized in the beds as a means for improving the product recovery in hydrogen PSA systems. For example, U.S. Pat. No. 6,814,787 is directed to PSA apparatus and process for the production of purified hydrogen from a feed gas stream containing heavy hydrocarbons (i.e., hydrocarbons having at least six carbon atoms). The apparatus includes at least one bed containing at least three layers. The layered adsorption zone contains a feed end with a low surface area adsorbent (20 to 400 $m^2$/g) which comprises 2 to 20% of the total bed length followed by a layer of an intermediate surface area adsorbent (425 to 800 $m^2$/g) which comprises 25 to 40% of the total bed length and a final layer of high surface area adsorbent (825 to 2000 $m^2$/g) which comprises 40 to 78% of the total bed length.

U.S. Pat. No. 6,340,382, is directed to a PSA process that purifies hydrogen from a mixture that passes through an aluminum oxide ($Al_2O_3$) layer for moisture removal, then through activated carbon layer for carbon dioxide ($CO_2$), carbon monoxide (CO), and methane ($CH_4$) removal, and finally through CaX zeolite layer for nitrogen ($N_2$) removal to produce high purity $H_2$ (>99.99%). CaX is at least 90% Ca exchanged with $SiO_2/Al_2O_3$=2.0.

U.S. Pat. No. 7,537,742 B2 relates to an optimum set of adsorbents for use in hydrogen PSA systems. Each adsorbent bed is divided into four regions. The first region contains adsorbent for removing water. The second region contains a mixture of strong and weak adsorbents to remove bulk impurities like $CO_2$. The third region contains a high bulk density (>38 lbm/$ft^3$) adsorbent to remove remaining $CO_2$ and most of $CH_4$ and CO present in the hydrogen containing feed mixtures. The fourth region contains adsorbent having high Henry's law constants for the final cleanup of $N_2$ and residual impurities to produce hydrogen at the desired high purity.

U.S. Pat. No. 6,402,813 B2 describes the purification of a gas mixture by adsorption of the impurities on carbon adsorbent formed by a combination of several different active carbons. In particular, a PSA process is described for purifying a gas, such as hydrogen, nitrogen, oxygen, carbon monoxide, argon, methane or gas mixtures containing these components. The gas stream to be purified is passed through layers of carbons, wherein the ordering of the carbon layers are such that at least one of the following conditions exist: (1) the density (D) is such that D1<D2; (2) the specific surface area (SSA) is such that SSA1>SSA2; 3) the mean pore size (MPS) is such that MPS1>MPS2, and (4) the pore volume is such that PV1>PV2. More specifically, this patent relates to a process in which at least two layers of activated carbons are used in which the first layer carbon has lesser density than the second, the first carbon has more specific surface area, and also more mean pore size than the second carbon.

To overcome the disadvantages of the related art six bed PSA systems, it is an object of the present invention to introduce new and advanced PSA cycles with turndown modes, which include all of the following features (1) no need for additional storage tank; (2) no idle steps (3) higher recovery than the related art cycles.

It is another object of the invention to modify the adsorbent system in each bed to contain at least three layers of adsorbents (e.g., alumina, activated carbon and zeolite), wherein the active carbon and zeolite components are layered based on particle size and enables additional improvement in hydrogen recovery. Therefore, an efficient PSA separation process has been found with high hydrogen recovery, lower adsorbent requirements, (i.e., lower bed size factor (BSF)), and lower capital and operating costs. Additionally, the process should operate efficiently when one or more beds are taken offline for operational reasons such as valve failure (referred herein, as "turndown" or "turndown mode").

BACKGROUND OF THE INVENTION

The invention provides a pressure swing adsorption process for the separation of a pressurized feed gas supply containing one or more strongly adsorbable components and at least one less strongly adsorbable product gas in a multiple bed system. The feed gas is supplied to a feed end of an adsorbent bed containing solid adsorbent material(s), which preferentially adsorbs the more strongly adsorbable component(s) and withdrawing the least strongly adsorbable product component from an exit end of the adsorber bed, producing in cycle including steps in which the continuous feed gas sequentially co-currently flows through each of the adsorber beds to produce gas product using continuous feed gas, pressurization steps, pressure equalization steps, blowdown step(s), and purge step(s).

The product gas of the process is preferably hydrogen although the process can be extended to other separation processes such as helium purification, natural gas upgrading, $CO_2$ production from synthesis gas or other source containing $CO_2$ in the supply feed or in other PSA processes for coproduction of $H_2$ and $CO_2$. One of the novel features of the present invention is the introduction of a new and advanced cycle to a six bed PSA system having four equalization steps to achieve enhanced $H_2$ recovery. This cycle can be further modified and utilized to operate the PSA system in a turndown mode with a relatively small reduction in throughput, thereby allowing the PSA system to operate with as few as four beds, yet maintaining a throughput of hydrogen above 90%. Another novel feature of the invention is the layered adsorbent, which can be utilized in the beds. These layered configurations of carbon and/or zeolite components differ from another layer of similar adsorbent material in particle size. These layered configurations of the bed materials combined and the PSA cycles provide a synergistic effect with an overall improvement in hydrogen recovery and throughput of 1-2% over conventional PSA cycles.

BRIEF DESCRIPTION OF THE FIGURES

The objects and advantages of the invention will be better understood from the following detailed description of the preferred embodiments thereof in connection with the accompanying figures wherein.

DETAILED DESCRIPTION OF THE INVENTION

The invention discloses high efficiency PSA processes/cycles employed in a six bed PSA system to attain 20-50 million standard cubic feet per day (MMSCFSD) of hydrogen production. The cycles achieve enhanced recovery of hydrogen from a hydrogen containing gas. The invention provides the following features:

Novel and advanced PSA cycles for six bed PSA systems which can be operated in turndown mode, and provide high hydrogen recovery.

The novel six bed PSA cycle has at least four bed-to-bed equalization steps; and The elimination of idle steps in the cycles and no need for segregated storage tanks.

Another aspect of the invention concerns the adsorbents loaded into the beds of the hydrogen PSA to enhance the recovery of hydrogen. It has been found that the three layers of adsorbents where in each layer is subdivided into two layers containing the same adsorbent, yet with different particle size, optimal adsorption and desorption kinetics for specific impurities present in the hydrogen containing feed gas is attained. This advanced adsorbent layering configuration thereby results in an improvement in hydrogen recovery.

Typical hydrogen PSA process utilizes three different adsorbents loaded in the vessel from the bottom to the top in the order such as (1) alumina; (2) activated carbon and (3) zeolite. There are five major impurities to be removed by adsorption process. Alumina adsorbs the moisture contained in the feed gas. Activated carbon layer is usually designed to take care of carbon dioxide and hydrocarbons such as methane, ethane, and propane. The zeolite function is to remove carbon monoxide, nitrogen, argon and residual methane not taken out by activated carbon placed upstream of the zeolite. Additional details of the layers of adsorbents in each PSA bed are discussed in Baksh et al (U.S. Pat. No. 7,537,742 B2), which is co-owned by the assignee of the present invention, and is incorporated by reference herein, in its entirety.

Figure 1:
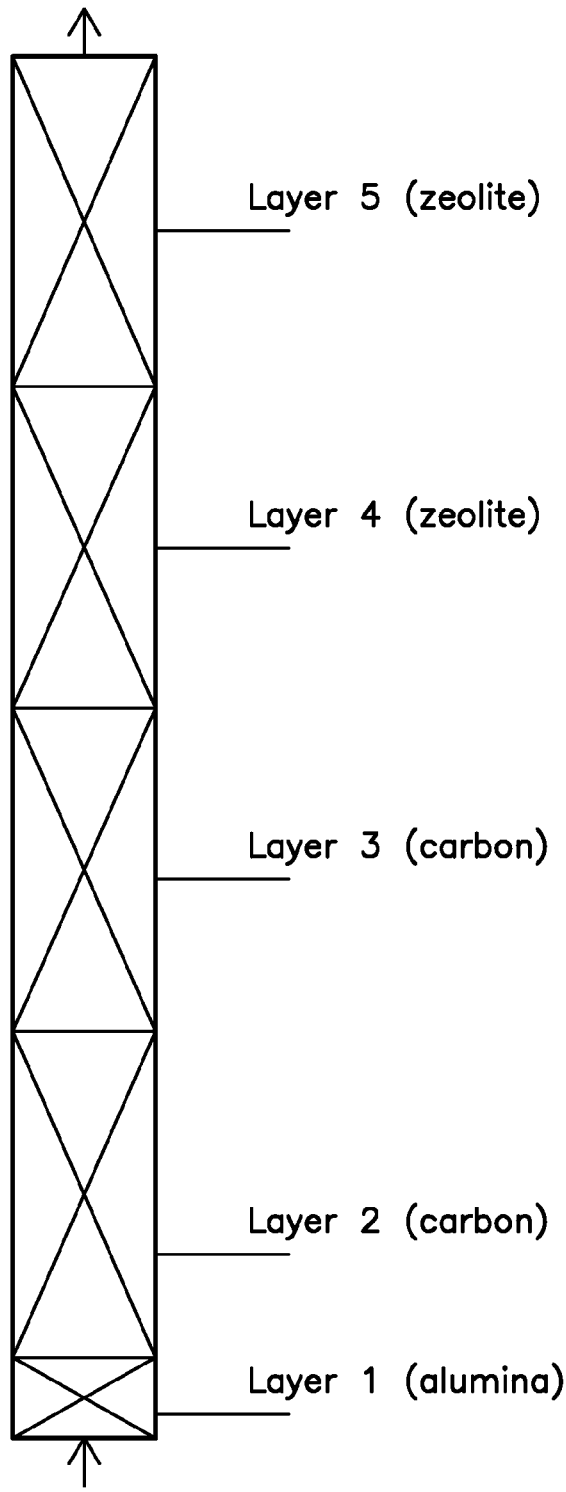
FIG. 1 illustrates an advanced bed configuration/layering in accordance with one aspect of the invention.

FIG. 1 is illustrative of the adsorbents layers in each of the PSA beds of the invention. The adsorption properties in layers two, three, four and five are fine tuned by optimizing the particle size of the adsorbent used to achieve optimal PSA process performance. As an example, layers two and three are identical (e.g., both are the same carbon material) except for the difference in particle sizes. Likewise, layers four and five are identical (i.e., both are the same zeolite material), but their particle size is different. The adsorber vessel design and configuration is such that it will be capable to adsorb five different components. Ideally, layer 1 adsorbs moisture, layer 2 adsorbs carbon dioxide, layer 3 adsorbs methane, layer 4 adsorbs carbon monoxide and layer 5 adsorbs nitrogen. Those skilled in the art will recognize that the process recovery will be maximized when adsorbents are fully utilized. Using a three layer design, the skilled artisan has only three degrees of freedom to size the adsorber for removal of five components. The inventive approach adds two more degrees of freedom thus making it possible to achieve higher hydrogen recovery in combination with the new 6-1-4 cycle of this invention.

The adjustment of the adsorbent particle size affects the rate of adsorption and desorption process—the adsorption capacity is independent of particle size. The diffusion resistance in an adsorption process is the sum of all diffusion resistances within the particle of the adsorbent material. The change in the particle size may or may not affect the overall diffusion resistance depending on the level of contribution of the diffusion phenomena affected by the particle size.

Figure 2A:
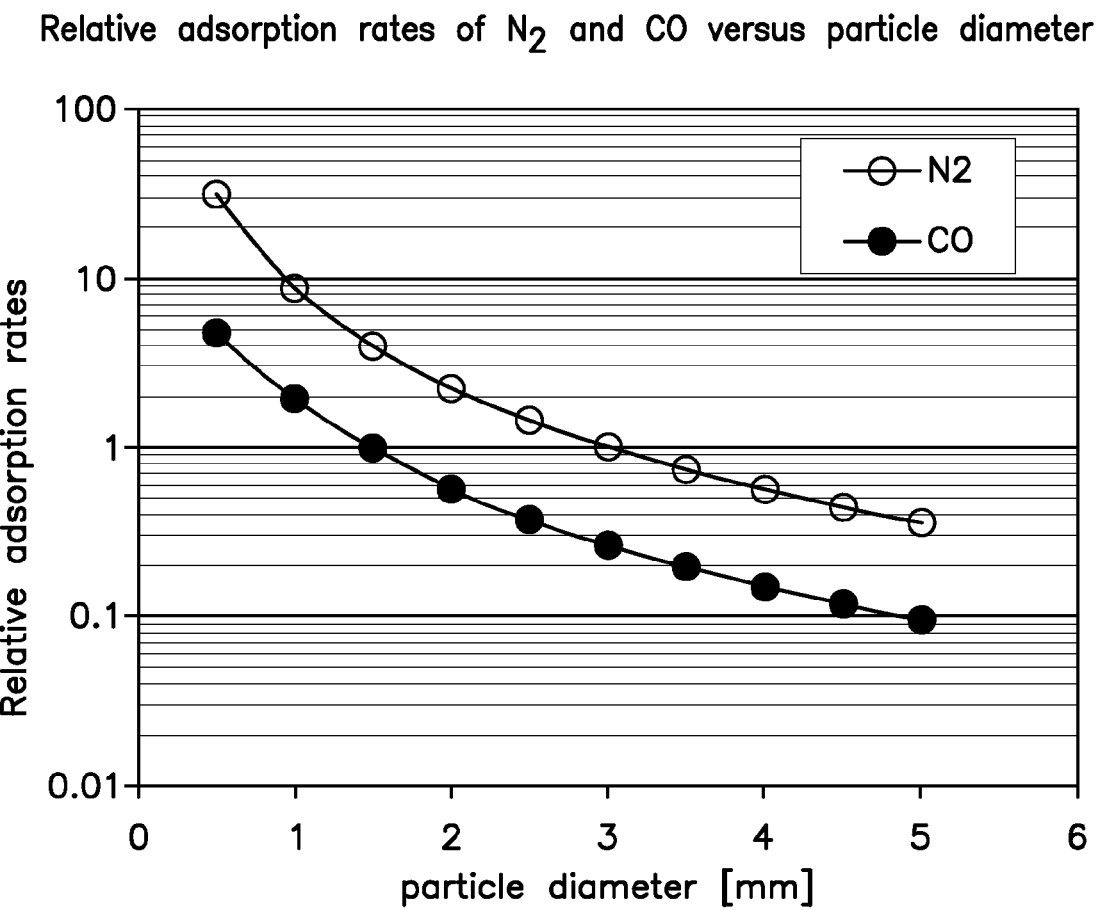
FIG. 2A is a plot of the relative adsorption rates of $N_2$ and CO versus particle diameter for the zeolite layers shown in FIG. 1.

In one embodiment, CaX(2.3) zeolite is used in the fourth and fifth layers of FIG. 1. The layers are sized such that layer four preferably adsorbs carbon monoxide and layer five preferably adsorbs nitrogen. With reference to FIG. 2A, the dependence of relative adsorption rates on particle diameter for both nitrogen and carbon monoxide is shown. The Zero Length Column (ZLC) technique is employed to obtain the data plotted in FIG. 2A. See, J. A. C. Silva & A. E. Rodrigues, Gas. Sep. Purif., Vol. 10, No. 4, pp. 207-224, 1996.

The value of the relative adsorption rate is the ratio of true adsorption rate and the standard rate value. The standard rate value corresponds to a required minimum rate needed to yield the enhanced PSA process performance. If the same particle size (e.g., 2.5 mm) is used for both layers in the process the requirement for nitrogen rate is satisfied. However, as can be determined from FIG. 2A, the CO relative adsorption rate is only 40% of the required minimum. Therefore, it is desirable to decrease the zeolite particle size in layer four in order to increase the rate of carbon monoxide adsorption. A value of 1.5 mm meets the design specification for the rate of carbon monoxide in this particular exemplary embodiment. It is obvious that one could increase the nitrogen rate as well by decreasing the particle size in layer five. As a result, only negligible process improvement will be realized since the nitrogen adsorption rate is already above the required minimum value. On the other hand; the process performance can suffer from the increased pressure drop in the bed. The preferred layering for this particular example will be particle sizes larger than 2 mm and smaller than 3 mm for layer five and particle sizes larger than 0.5 mm and smaller than 2 mm for layer four.

Figure 2B:
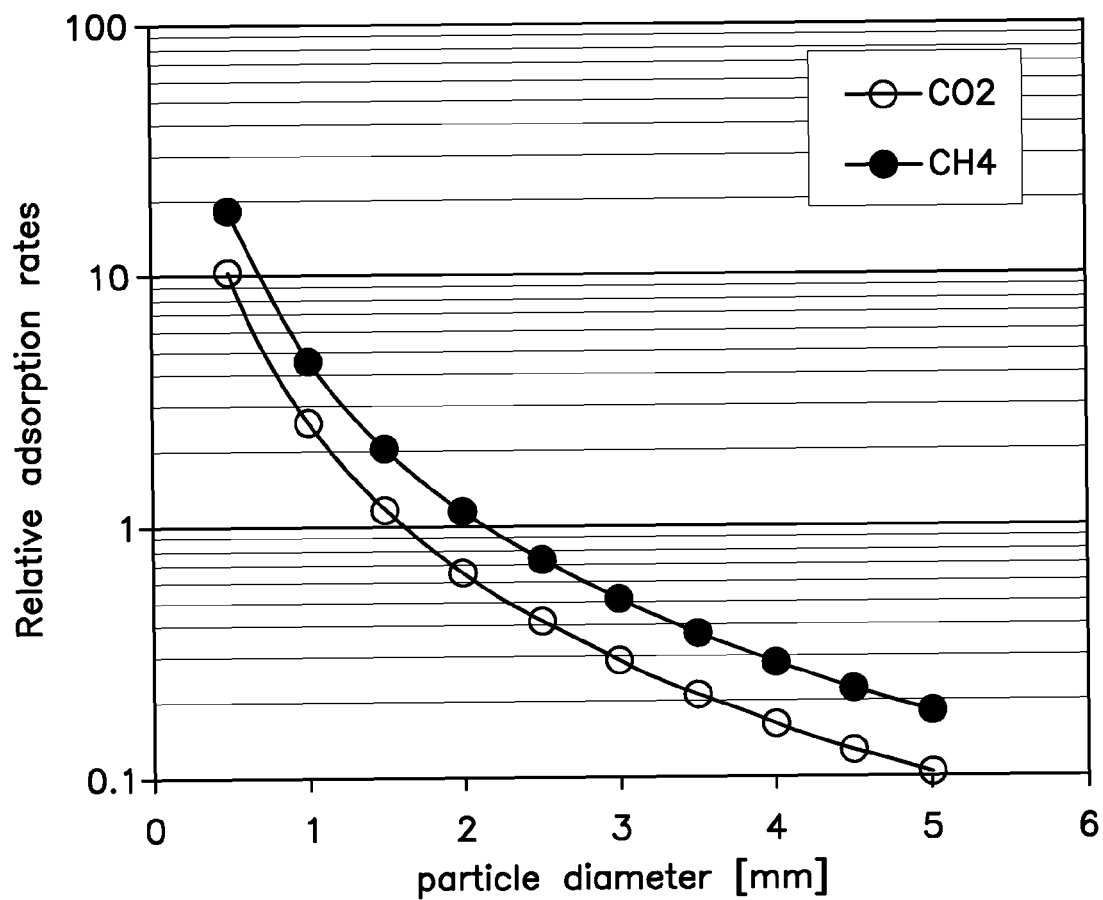
FIG. 2B is a plot of the relative adsorption rates of $CO_2$ and $CH_4$ versus particle diameter for the carbon layers shown in FIG. 1.

Carbon layers two and three will be occupied with the carbon particles of different size as well. The ZLC technique is employed once again to measure the adsorption rates for carbon dioxide and methane on the carbon material. The rate data normalized by the standard rate is summarized in FIG. 2B. The rate for methane is satisfactory at particle sizes less than 2.25 mm. However, the smaller particles are needed to obtain reasonable rates for carbon dioxide. By inspection of the data in FIG. 2B, the preferred carbon particle size for carbon dioxide take out is less than 1.5 mm and for methane less than 2 mm. Thus the layering for this particular example will be particle sizes larger than 1.0 mm and smaller than 2.0 mm for layer three and particle sizes larger than 0.5 mm and smaller than 1.5 mm for layer two.

The novel PSA cycles of the present invention will now be described with reference to various exemplary embodiments. In one embodiment of the invention, the novel PSA system employs an eighteen-step, six adsorbent bed PSA cycle having four equalization steps, in addition to purging, blowdown and product pressurization steps (referred herein as "the 6-1-4 PSA cycle"). The PSA system includes a continuous supply of feed gas to at least one bed which in adsorption. This bed separates the pressurized supply feed gas containing one or more strongly adsorbable component and allowing the less strongly adsorbable hydrogen product gas to exit the bed.

In another embodiment of the invention, the PSA system can be utilized in turndown mode with five beds. The PSA cycle for the five beds would include fifteen steps, where one bed is in adsorption and has three equalization steps in addition to the purging and product pressurization steps (referred herein as "the 5-1-3 PSA cycle").

In an alternative embodiment of the invention, the PSA system having six beds employs an eighteen steps cycle where two of the beds are simultaneously in the adsorption phase, and each bed has at least three equalization steps in addition to purging and product pressurization steps referred herein as "the 6-2-3 PSA cycle")

Figure 3:
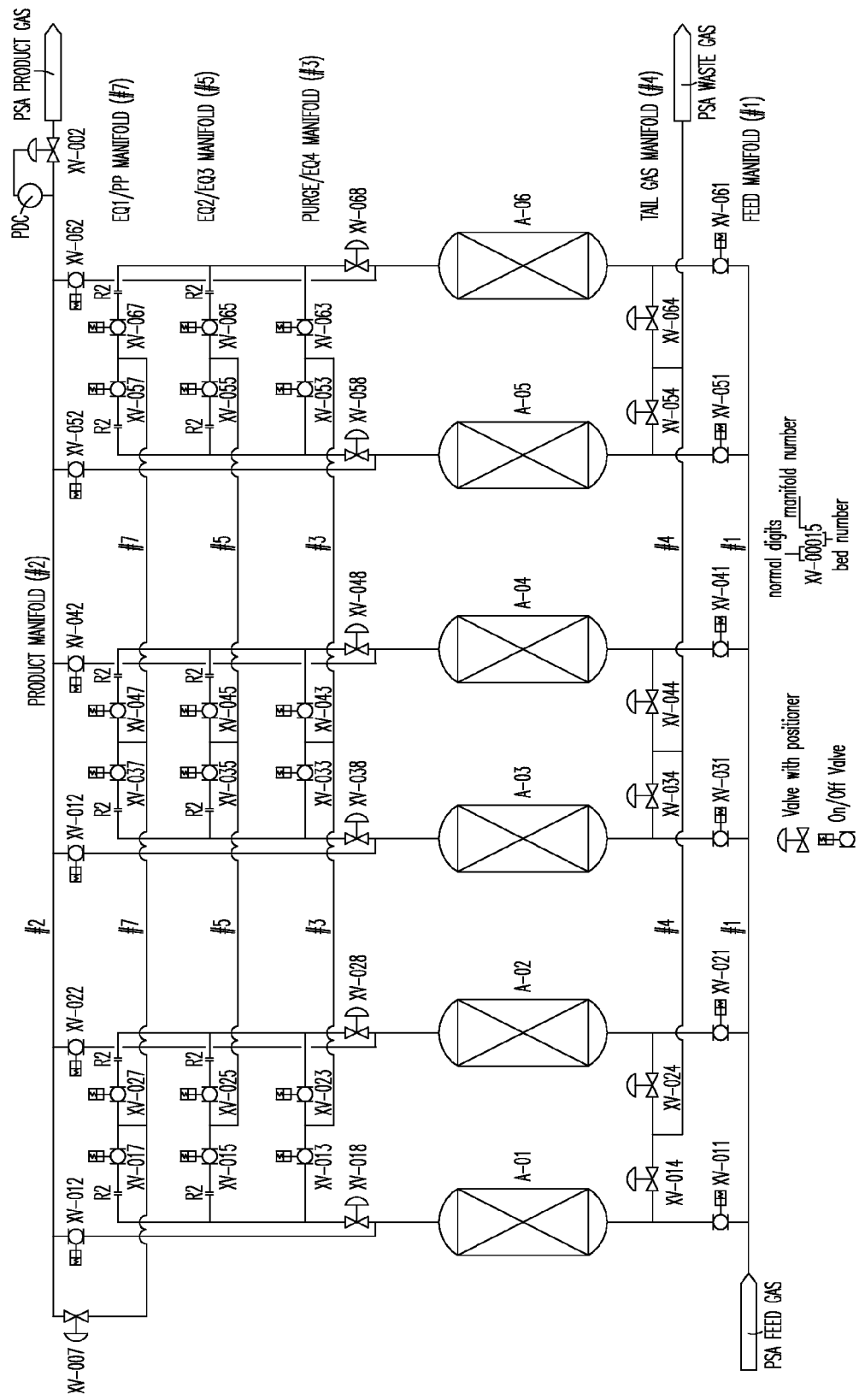
FIG. 3 is an illustrative six bed H$_2$ PSA system/skid utilized with the cycles of the present invention.

With reference to FIG. 3 and Tables 2 and 3, the mode of operation for the 6-1-4 PSA cycle is illustrated. Specifically, the sequence of steps for the 6-1-4 PSA cycle is performed in the order recited in each of the adsorption vessels in turn. .

TABLE 2

6-1-4 PSA cycle chart

| Bed# | Step: 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | A1 | A2/PP1 | A3/PP2 | E1 | E2 | E2 | E3 | PPG | E4/BD1 | BD2 | PG | E4' | E3' | E2' | E2' | E1' | PP1 | PP2 |
| 2 | E1' | PP1 | PP2 | A1 | A2/PP1 | A3/PP2 | E1 | E2 | E2 | E3 | PPG | E4/BD1 | BD2 | PG | E4' | E3' | E2' | E2' |
| 3 | E3' | E2' | E2' | E1' | PP1 | PP2 | A1 | A2/PP1 | A3/PP2 | E1 | E2 | E2 | E3 | PPG | E4/BD1 | BD2 | PG | E4' |
| 4 | BD2 | PG | E4' | E3' | E2' | E2' | E1' | PP1 | PP2 | A1 | A2/PP1 | A3/PP2 | E1 | E2 | E2 | E3 | PPG | E4/BD1 |
| 5 | E3 | PPG | E4/BD1 | BD2 | PG | E4' | E3' | E2' | E2' | E1' | PP1 | PP2 | A1 | A2/PP1 | A3/PP2 | E1 | E2 | E2 |
| 6 | E1 | E2 | E2 | E3 | PPG | E4/BD1 | BD2 | PG | E4' | E3' | E2' | E2' | E1' | PP1 | PP2 | A1 | A2/PP1 | A3/PP2 |

It will be understood that the nomenclature provided for this 6-1-4 PSA cycle is the same for all the cycles discussed herein, where:
A1=First Adsorption Step
A2/PP1=Second Adsorption Step/First Product Pressurization
A3/PP2=Third Adsorption Step/Second Product Pressurization
E1=First Equalization Down
E2=Second Equalization Down
E3=Third Equalization Down
PPG=Provide Purge Gas
E4/BD1=Fourth Equalization Down/First Blowdown
BD2=Second Blowdown
PG=Purge
E4'=Equalization Up (using gas from E4 step)
E3'=Equalization Up (using gas from E3 step)
E2'=Equalization Up (using gas from E2 step)
E1'=Equalization Up (using gas from E1 step)
PP1=First Product Pressurization
PP2=Second Product Pressurization In some of the cycles, as the cycle may require, the following additional nomenclature shall be employed:
A2=Second Adsorption Step
A3=Third Adsorption Step
A4=Fourth Adsorption Step
A5=Fifth Adsorption Step
PP=Product Pressurization
A3/PP1=Third Adsorption Step/First Product Pressurization Step
E3/BD1=Third Equalization Down/First Blowdown Step In Table 2, the rows correspond to a particular bed in the PSA process while the columns represent the step number. The duration of one cycle sequence (one row) is referred to as the total cycle time or cycle time (CT). The cycle time is constant for each bed. The relative shift in the cycle steps among the beds can be inferred from Table 2 as well. This shift is equal to $\frac{1}{6}^{th}$ of the CT since there are six beds in this particular cycle. In order for the 6-1-4 PSA cycle to be fully defined the step times for step 1, 2 and 3 must be assigned—such as $t_1$, $t_2$ and $t_3$. The duration of the basic block, also referred to as the feed time, is then defined as $t_1+t_2+t_3$. Employing the cycle periodicity described above, the CT=6*$(t_1+t_2+t_3)$ and it follows that the duration of steps 1, 4, 7, 10, 13 & 16 are equal in time (i.e., $t_1$); steps 2, 5, 8, 11, 14 & 17 (i.e., $t_2$) and steps 3, 6, 9, 12, 15 & 18 (i.e., $t_3$). Hence, there are eighteen steps in the cycle, the mode of operation for each bed is offset by three steps.

The 6-1-4 PSA cycle sequence is now described with respect to one bed which undergoes the entire PSA cycle. A representative PSA train/skid system having six beds in parallel is depicted in FIG. 3, and is employed herein to illustrate this embodiment. The system includes 30 on/off valves, and 14 control valves, 6 manifolds (although the sixth manifold is labeled "7" in FIG. 3 in order to designate the PSA skid components with consistent nomenclature, as set forth below) and associate pipings and fitting. The control valves are utilized to control the flow rate or pressure during certain process steps while the on/off valves allow communication between the various beds in the PSA system. The valve sequencing representing the steps in the 6-1-4 PSA cycle of FIG. 3 is illustrated in Table 3, below, where the valve chart defines the position or action for each valve (i.e., open=O, closed=C, and CV=control valve) in a particular step of the PSA cycle.

TABLE 3

6-1-4 PSA cycle valve chart

| | Step # 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| XV-007 | C | CV | CV | C | CV | CV | C | CV | CV | C | CV | CV | C | CV | CV | C | CV | CV |
| XV-002 | CV | CV | CV | CV | CV | CV | CV | CV | CV | CV | CV | CV | CV | CV | CV | CV | CV | CV |
| XV-011 | O | O | O | C | C | C | C | C | C | C | C | C | C | C | C | C | C | C |
| XV-012 | O | O | O | C | C | C | C | C | C | C | C | C | C | C | C | C | C | C |
| XV-013 | C | C | C | C | C | C | O | O | O | C | C | C | C | C | C | C | C | C |
| XV-014 | C | C | C | C | C | C | C | CV | CV | CV | C | C | C | C | C | C | C | C |
| XV-015 | C | C | C | C | O | O | O | C | C | C | C | O | O | O | C | C | C | C |
| XV-017 | C | C | C | O | C | C | C | C | C | C | C | C | C | C | C | O | O | O |
| XV-018 | C | C | C | CV | CV | CV | CV | CV | CV | C | O | O | O | O | O | O | O | O |

TABLE 3-continued 6-1-4 PSA cycle valve chart

| | Step # | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| XV-021 | C | C | C | O | O | O | C | C | C | C | C | C | C | C | C | C | C | C |
| XV-022 | C | C | C | O | O | O | C | C | C | C | C | C | C | C | C | C | C | C |
| XV-023 | C | C | C | C | C | C | C | C | C | C | O | O | C | O | O | C | C | C |
| XV-024 | C | C | C | C | C | C | C | C | C | C | C | CV | CV | CV | C | C | C | C |
| XV-025 | C | C | C | C | C | C | C | O | O | O | C | C | C | C | C | O | O | O |
| XV-027 | O | O | O | C | C | C | O | C | C | C | C | C | C | C | C | C | C | C |
| XV-028 | O | O | O | C | C | C | CV | CV | CV | CV | CV | CV | C | O | O | O | O | O |
| XV-031 | C | C | C | C | C | C | O | O | O | C | C | C | C | C | C | C | C | C |
| XV-032 | C | C | C | C | C | C | O | O | O | C | C | C | C | C | C | C | C | C |
| XV-033 | C | C | C | C | C | C | C | C | C | C | C | C | C | O | O | C | O | O |
| XV-034 | C | C | C | C | C | C | C | C | C | C | C | C | C | C | CV | CV | CV | C |
| XV-035 | O | O | O | C | C | C | C | C | C | C | O | O | O | C | C | C | C | C |
| XV-037 | C | C | C | O | O | O | C | C | C | O | C | C | C | C | C | C | C | C |
| XV-038 | O | O | O | O | O | O | C | C | C | CV | CV | CV | CV | CV | CV | C | O | O |
| XV-041 | C | C | C | C | C | C | C | C | C | O | O | O | C | C | C | C | C | C |
| XV-042 | C | C | C | C | C | C | C | C | C | O | O | O | C | C | C | C | C | C |
| XV-043 | C | O | O | C | C | C | C | C | C | C | C | C | C | C | C | C | O | O |
| XV-044 | CV | CV | C | C | C | C | C | C | C | C | C | C | C | C | C | C | C | CV |
| XV-045 | C | C | C | O | O | O | C | C | C | C | C | C | C | O | O | O | C | C |
| XV-047 | C | C | C | C | C | C | O | O | O | C | C | C | O | C | C | C | C | C |
| XV-048 | C | O | O | O | O | O | O | O | O | C | C | C | CV | CV | CV | CV | CV | CV |
| XV-051 | C | C | C | C | C | C | C | C | C | C | C | C | O | O | O | C | C | C |
| XV-052 | C | C | C | C | C | C | C | C | C | C | C | C | O | O | O | C | C | C |
| XV-053 | C | O | O | C | O | O | C | C | C | C | C | C | C | C | C | C | C | C |
| XV-054 | C | C | CV | CV | CV | C | C | C | C | C | C | C | C | C | C | C | C | C |
| XV-055 | O | C | C | C | C | C | O | O | O | C | C | C | C | C | C | O | O | O |
| XV-057 | C | C | C | C | C | C | C | C | C | O | O | O | C | C | C | O | C | C |
| XV-058 | CV | CV | CV | C | O | O | O | O | O | O | O | O | C | C | C | CV | CV | CV |
| XV-061 | C | C | C | C | C | C | C | C | C | C | C | C | C | C | C | O | O | O |
| XV-062 | C | C | C | C | C | C | C | C | C | C | C | C | C | C | C | O | O | O |
| XV-063 | C | C | C | C | O | O | C | O | O | C | C | C | C | C | C | C | C | C |
| XV-064 | C | C | C | C | C | CV | CV | CV | C | C | C | C | C | C | C | C | C | C |
| XV-065 | C | O | O | O | C | C | C | C | C | O | O | O | C | C | C | C | C | C |
| XV-067 | O | C | C | C | C | C | C | C | C | C | C | C | O | O | O | C | C | C |
| XV-068 | CV | CV | CV | CV | CV | CV | C | O | O | O | O | O | O | O | O | C | C | C |

Step No. 1 (A1): The feed gas mixture is introduced to the bottom of Bed 1 from the feed manifold at high pressure. Both valves 011 (i.e., XV-011) and 012 (i.e., XV-012) are open while all other Bed 1 valves (XV-01x) are closed. Hereinafter valve tag numbers will be referred to without using the prefix XV. The feed mixture flows from the bottom to the top of the bed. This upward flow direction in the vessel is referred to as co-current flow with respect to feed. During this adsorption step the impurities are adsorbed and high purity hydrogen is collected and routed through product manifold number 2. Control valve 002 is used to control the pressure in the bed in (A1), (A2) or (A3) steps (i.e. the feed/production steps).

Steps No. 2 and 3 (A2/PP1 and A3/PP2): These steps are identical except for their respective duration $t_2$ and $t_3$. Valves 011 and 012 remain open, and Bed 1 continues in the feed/production step. In addition, control valve 007 is used to control the rate of product pressurization steps (PP1) and (PP2). As shown in Table 2, above, it is the Bed 2 that is receiving the product pressurization gas from Bed 1 in Steps No. 2 and 3 through valves 007, 027 and 028. All other valves associated with Bed 2 are closed. It is important that the pressures in Bed 1 and Bed 2 are equal at the end of (A3/PP2) step so that the Bed 2 can enter the feed/production step (A1) in Step 4. It is also desirable that the (PP1) and (PP2) step flow rates are regulated by valve 007 to be as low as possible in order to prevent the fluidization and to keep the pressure in Bed 1 as high as possible.

Step No. 4 (E1): Bed 1 undergoes the first bed-to-bed equalization step while Bed 3 is counter currently receiving the equalization gas—step (E1'). The (E1) step is sometimes referred to as co-current depressurization step. Bed 1 valves 017, 018 and Bed 3 valves 037 and 038 are open while all other Bed 1 and Bed 3 valves (i.e., 01x and 03x) are closed. The rate of (E1)-(E1') steps is controlled by control valve 018.

Steps No. 5 and 6 (E2): Bed 1 undergoes the second equalization (E2) for the duration of these two steps. Specifically, the pressure in Bed 1 drops due to co-current gas flow from Bed 1 to Bed 4 undergoing step (E2') during these steps. The pressures in both beds are equal at the end of step No. 6. Valves 015, 045 and 048 are fully open while valve 018 controls the rate of (E2)-(E2') steps.

Step No. 7 (E3): Bed 1 executes the third equalization step (E3). This step uses the same equalization manifold as the previous step (E2). Valves 015, 055 and 058 are fully open while valve 018 controls the rate of (E3)-(E3') steps. It is clear from the valve nomenclature that Bed 5 is in communication with Bed 1 using manifold number 5.

Step No. 8 (PPG): Bed 1 co-currently provides purge gas to Bed 6, which is being purged. To this end valve 013 is open and control valve 018 is used to control the rate of the (PPG) step. The purge gas flows to the purge manifold number 3 to Bed 6 while valves 063 and 068 are fully open. Counter-current purge step uses hydrogen rich stream to aid the regeneration of adsorbents in the vessels. Desorbed impurities leave the Bed 6 through the control valve 064 and eventually are collected in a surge drum (not shown). From the operational standpoint, the longer the purge step the better the adsorbent regeneration and thus better process working capacity. This means that the purge step time ($t_2$) should be long and as mentioned above the product pressurization step time $(t_2+t_3)$ should be long as well, if permitted by process. This condition is easily satisfied for 6-1-4 cycle shown in Table 2 since the (PG) and (PP1) steps overlap; their step time is $t_2$.

Step No. 9 (E4/BD1): This step is the fourth equalization step (E4) coupled with a blowdown step (BD1) executed sequentially. At the beginning of step 9, valves 013, 063 and 068 are open and valve 018 is used to control the rate of the fourth equalization step. Proper management of adsorption/desorption processes taking place in this step is essential for the superior 6-1-4 cycle performance. The gas used for the co-current depressurization step (E4) must be rich in hydrogen. This is achieved by advanced layering technology (i.e. the use of CaX type zeolite adsorbent while larger particles located at the top of the vessel and smaller particles below), discussed in detail above. Once Bed 1 and Bed 6 have reached pressure equalization (i.e., EQ4 is completed), the above mentioned valves associated with EQ4 step are closed and valve 014 is opened to enable the blowdown step where a portion of the gas in Bed 1 is directed to the surge drum (not shown). The (BD1) flow rate is controlled by valve 014. As a consequence, this Step 9 of 6-1-4 cycle does not generate any offgas for the duration of EQ4 step. The offgas is generated only during the BD1 portion of step 9. The duration of this lowest pressure equalization and blow down step (i.e., EQ4/BD1) is less than 15% of the feed time (i.e., $(t_1+t_2+t_3)$).

Step No. 10 (BD2): This step in Bed 1 is carried out to rid the vessel of the impurities adsorbed during co-current steps (AD, EQ, PPG) through the bottom of the vessel. At this point in the cycle, the pressure in the vessel is too low to hold on to the impurities. As a result, they are desorbed and counter-currently directed to the surge drum through valve 014. All other valves associated with Bed 1 are closed during this step.

Step No. 11 (PG): Bed 1 is receiving the purge gas from Bed 2. Valves 018, 013, 023 are fully open; the rate of (PPG) step and the pressure in Bed 1 is controlled via valves 028 and 014, respectively.

Step No. 12 (E4'): The first step designated as equalization up to reference the bed receiving the gas. The beds in (E4/BD1) and (E4') steps are interacting such that the content of Bed 2 is transferred to Bed 1 until the pressures in both beds is equalized. Valves 023, 013 and 018 are fully open and the action of control valve 028 provides means to control the rate of this step.

Step No. 13 (E3'): Bed 1 is receiving gas from Bed 3. Valves 015, 035 and 018 are fully open and the action of control valve 038 provides means to control the rate.

Steps No. 14 and 15 (E2'). Bed 1 is receiving gas from Bed 4. Valves 015, 045 and 018 are fully open and the action of control valve 048 provides means to control the rate.

Step No. 16 (E1'): The last equalization step where Bed 1 receives the gas from Bed 5. Valves 017, 057 and 018 are fully open and the action of control valve 058 provides means to control the rate.

Steps No. 17 and 18 (PP1 and PP2): The last two steps in the cycle description with regards to Bed 1 are the (PP1) and (PP2) steps already described above.

Basic functionality of the cycle can be described in the same fashion for any bed. However, once the step sequence for one bed is defined the step sequences for other beds will follow in the same order and the relative time shift will be $\frac{1}{6}^{th}$ of the cycle time (CT), (e.g., Bed 2 starts the adsorption (A1) in step number 4, compared to Bed No. 1 that goes through (A1) in step number 1).

During the operation of a plant employing a six bed PSA process it may be desirable to operate the plant in the turn-down mode for a limited period of time. In the case of a six bed/vessel PSA system, this mode enables the continuous production with only five vessels online while one of the beds or valves associated with a given bed failed and need to be serviced. It is often seen in the industry that the plant performance significantly deteriorates when operating in exceptional mode. With reference to Table 4, below, the mode of operation of the new 5-1-3 PSA cycle is described.

TABLE 4

5-1-3 PSA cycle chart

| Bed# | Step: | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 1 | A1 | A2 | A3/PP | E1 | E1 | E2 | PPG | E3/BD1 | BD2 | PG | E3' | E2' | E1' | E1' | PP1 |
| 2 | E1' | E1' | PP | A1 | A2 | A3/PP | E1 | E1 | E2 | PPG | E3/BD1 | BD2 | PG | E3' | E2' |
| 3 | PG | E3' | E2' | E1' | E1' | PP1 | A1 | A2 | A3/PP | E1 | E1 | E2 | PPG | E3/BD1 | BD2 |
| 4 | PPG | E3/BD1 | BD2 | PG | E3' | E2' | E1' | E1' | PP | A1 | A2 | A3/PP | E1 | E1 | E2 |
| 5 | E1 | E1 | E2 | PPG | E3/BD1 | BD2 | PG | E3' | E2' | E1' | E1' | PP | A1 | A2 | A3/PP |

In order for the 5-1-3 PSA cycle to be fully defined the step times for step 1, 2 and 3 must be assigned—such as $t_1$, $t_2$ and $t_3$. The duration of basic block is then defined as $t_1+t_2+t_3$. By using the cycle periodicity the total $CT=5*(t_1+t_2+t_3)$ and it follows that the duration of steps 1, 4, 7, 10 & 13 equal to $t_1$; steps 2, 5, 8, 11 & 14 equal to $t_2$ and steps 3, 6, 9, 12 & 15 equal to $t_3$. The cycle sequence will be described bellow in detail with respect to Bed 1 for illustration purposes assuming that Bed 6 is offline and completely isolated from the rest of the process. Functionality of the cycle is explained using hydrogen the PSA process valve skid shown FIG. 3. The 5-1-3 PSA cycle sequence is now described with respect to one bed which undergoes the entire PSA cycle (i.e., CT).

Steps 1 and 2 (A1 and A2): Bed 1 begins the process cycle in the adsorption steps (A1) and (A2). Both valves 011 and 012 are open while all other Bed 1 valves (01x) are closed; the high purity hydrogen is collected and sent through the product manifold number 2. Control valve 002 is used to control the pressure in the bed in (A1), (A2) or (A3) steps (i.e. all feed/production steps).

Step 3 (A3/PP1): Valves 011 and 012 remain open, Bed 1 continues in the feed/production step. In addition, the control valve 007 is used to control the rate of product pressurization step (PP1). Therefore, Bed 2 is receiving the product pressurization gas from Bed 1 through valves 007, 027 and 028. All other valves associated with Bed 2 are closed.

Steps 4 and 5 (E1): Bed 1 undergoes the first bed-to-bed equalization step (E1) while Bed 3 is counter-currently receiving the equalization gas—step (E1'). Bed 1 valves 017, 018 and Bed 3 valves 037 and 038 are open while all other Bed 1 and Bed 3 valves (01x) and (03x) are closed. The rate of (E1)-(E1') steps is controlled by control valve 018.

Step 6 (E2): The pressure in Bed 1 drops due to gas flow from Bed 1 to Bed 4 undergoing step (E2'). The pressures in both beds are equal at the end of step 6. Valves 015, 045 and 048 are fully open while valve 018 controls the rate of (E2)-(E2') steps.

Step 7 (PPG): Bed 1 sends purge gas to Bed 5 in the purge step (PG). Valve 013 is open and control valve 018 is used to control the rate of (PPG) step. The purge gas flows through the purge manifold number 3 to the Bed 5 while valves 053 and 058 are fully open. Desorbed impurities leave the Bed 5 through the control valve 054 and eventually are collected in the surge drum (not shown).

Step 8 (E3/BD1): In Bed 1, the (E3) step coupled with a blowdown step (BD1). Both ends of Bed 1 are open. Valve 014 is opened to enable the blowdown step where a portion of the gas in Bed 1 is directed to the surge drum. In the meantime, valves 015, 055 and 058 are open and valve 018 is used to control the rate of third equalization step. The duration of this lowest pressure equalization and blow down step (E3/BD1) is less than 15% of the feed time.

Step 9 (BD2): The purpose of this step is to rid the vessel of the impurities adsorbed during co-current steps (AD, EQ, PPG) through the bottom of the vessel via valve 014. All other valves associated with Bed 1 are closed during this step.

Step 10 (PG): Is a purge step where Bed 1 is receiving the purge gas from Bed 2. Valves 018, 013, 023 are fully open. The rate of (PPG) step and the pressure in Bed 1 is controlled via valves 028 and 014 respectively.

Step 11 (E3'): This first equalization up step designates that the bed is receiving the gas. The beds in (E3) and (E3') steps are interacting such that the content of Bed 2 is transferred to Bed 1 until the pressures in both beds are equalized. Valves 025, 015 and 018 are fully open and the action of control valve 028 provides means to control the rate.

Step 12 (E2'): Bed 1 is receiving gas from Bed 3. Valves 015, 035 and 018 are fully open and the action of control valve 038 provides means to control the rate.

Step 13 and 14 (E1'): Bed 1 receives gas from Bed 4. Valves 017, 047 and 018 are fully open and the action of control valve 048 provides means to control the equalization step rate in steps 13 and 14.

Step 15 (PP1): The last step in the cycle description with regards to Bed 1 where the product pressurization occurs, as described above.

The five bed PSA system, it may be desirable to further operate the plant in a turndown mode with only four beds/vessels online. In such a case, the 4-1-2 PSA cycle of Baksh et al. (U.S. Pat. No. 6,340,382) is utilized and incorporated by reference in its entirely.

An example, a PSA process with the cycles described herein were simulated under the process conditions listed in Table 5, below. The model assumes the following feed gas composition for all cycles: 73.87% hydrogen, 0.23% nitrogen, 3.31% carbon monoxide, 16.37% carbon dioxide, 5.94% methane and 0.3% water. The feed gas temperature was 100° F. and feed gas pressure was 360 Psig.

TABLE 5

H₂ PSA cycles and corresponding process performance

| | PSA cycle | | |
|---|---|---|---|
| | 6-1-4 | 5-1-3 | 4-1-2 (Related Art) |
| Cycle Time [min] | 10.6 | 9.17 | 9.0 |
| [t₁, t₂, t₃] [sec] | [25, 65, 15] | [55, 15, 40] | [35, 65, 35] |

TABLE 5-continued

H₂ PSA cycles and corresponding process performance

| | PSA cycle | | |
|---|---|---|---|
| | 6-1-4 | 5-1-3 | 4-1-2 (Related Art) |
| High Pressure [Psig] | 360 | 360 | 360 |
| Low Pressure [Psig] | 5.0 | 5.0 | 5.0 |
| Temperature [K] | 310 | 310 | 310 |
| Bed ID [ft] | 12.5 | 12.5 | 12.5 |
| Feed Rate [MMSCFD] | 62 | 62 | 62 |
| H₂ Product Rate [MMSCFD] | 40.3 | 39.15 | 37.1 |
| Total BSF [lbs/TPD H₂] | 5,618 | 4,820 | 4,069 |
| H₂ Purity [%] | 99.999 | 99.999 | 99.999 |
| H₂ Recovery [%] | 88.0 | 85.5 | 81.0 |

Note 1: MMSCFD represents million standard cubic feet per day of gas where assumed standard conditions are 1 atmosphere pressure and temperature 70° F.;
Note 2: 1 Psig is a unit of pressure corresponding to 6894.757 Pascal; 1 lbs is a mass unit corresponding to 0.4535924 kg; K correspond to SI units for temperature of 1 Kelvin; ft represents distance 1 feet equal to 0.3048 meters;
Note 3: TPD H₂ represents tons (2000 lbs) of hydrogen per day;
Note 4: BSF (bed size factor) is the ratio of total mass of adsorbents in all beds and daily production of hydrogen in tons per days (see Note 3);
Note 5: The 4-1-2 PSA cycle has been modified for the purposes of the simulation to include the adsorbent layering of the present invention. This provides a one-to-one comparison of the cycles.

As shown in the Table 5, the new cycles having an additional equalization step, without the need for idle steps or otherwise offline storage tanks provides for a recovery of hydrogen as high as 88.0%. On the other hand, in the turndown mode with five and four beds online, the hydrogen recovery drops to 85.5% and 81.0%, respectively.

An alternative embodiment of the present invention is a six bed PSA system having dual feed. One of the benefits of using a dual feed cycle is higher throughput and lower bed size factor (BSF). As discussed with respect to the cycles above, BSF is a measure of process productivity per ton of hydrogen produced per day. This alternative PSA cycle has eighteen steps, two beds are simultaneously on the feed/process stage and three steps in the cycle are dedicated to bed-to-bed equalization. This 6-2-3 PSA cycle has an increased throughput capability of producing 40-70 MMSCFD of hydrogen versus 20-50 MMSCFD for 6-1-4 PSA cycle. The remainder of the innovative characteristics of the 6-2-3 PSA cycle are the same as the ones discussed with respect to the newly designed 6-1-4 and 5-1-3 PSA cycles.

The 6-2-3 PSA cycle has eighteen steps with two parallel feeds and three bed to bed equalization steps. Since six beds are used with an eighteen step cycle (18÷6), three cycle steps and their times (t1, t2, t3) must be described for full cycle definition. An alternative way for describing a cycle chart is to provide information on all of the beds for the duration of the unit block rather than describing the whole sequence for a single bed. For example, by defining all cycle steps in steps 1, 2 and 3 for 6-2-3 PSA cycle in Table 6, one has qualitatively defined all possible interactions among beds, valves and manifolds. The same sequence will be periodically repeating with period equal to $t_1+t_2+t_3$. This new method will be used to explain the functionality of 6-2-3 PSA cycle with reference to Table 6, below, in conjunction with FIG. 3.

TABLE 6

6-2-3 PSA cycle chart

| | Step: | | | | | | | | |
|---|---|---|---|---|---|---|---|---|---|
| Bed# | 1 | 2 | 3 | 4 | 5 | 6 | 7 | 8 | 9 |
| 1 | A1 | A2 | A3 | A4 | A5 | A6/PP | E1 | E1 | E2 |
| 2 | E1' | E1' | PP | A1 | A2 | A3 | A4 | A5 | A6/PP |

TABLE 6-continued

| 3 | PG | E3' | E2' | E1' | E1' | PP | A1 | A2 | A3 |
| 4 | PPG | E3/BD1 | BD2 | PG | E3' | E2' | E1' | E1' | PP |
| 5 | E1 | E1 | E2 | PPG | E3/BD1 | BD2 | PG | E3' | E2' |
| 6 | A4 | A5 | A6/PP | E1 | E1 | E2 | PPG | E3/BD1 | BD2 |

6-2-3 PSA cycle chart

| | Step: | | | | | | | | |
|---|---|---|---|---|---|---|---|---|---|
| Bed# | 10 | 11 | 12 | 13 | 14 | 15 | 16 | 17 | 18 |
| 1 | PPG | E3/BD1 | BD2 | PG | E3' | E2' | E1' | E1' | PP |
| 2 | E1 | E1 | E2 | PPG | E3/BD1 | BD2 | PG | E3' | E2' |
| 3 | A4 | A5 | A6/PP | E1 | E1 | E2 | PPG | E3/BD1 | BD2 |
| 4 | A1 | A2 | A3 | A4 | A5 | A6/PP | E1 | E1 | E2 |
| 5 | E1' | E1' | PP | A1 | A2 | A3 | A4 | A5 | A6/PP |
| 6 | PG | E3' | E2' | E1' | E1' | PP | A1 | A2 | A3 |

Step No. 1: Two beds are processing feed (adsorption step), namely Bed 1 and Bed 6. It follows that the valves 011, 012, 061 and 062 will be open. Bed 5 and Bed 2 are in communication executing (E1)-(E1') steps, where valves 057, 027, 028 are open and valve 058 is used to control the rate. Bed 4 is providing the purge gas (PG) for Bed 3. The rate of the (PPG) step is controlled by valve 048, while valves 043, 033, 038 are fully open and valve 034 is used to control the pressure in Bed 3.

Step No. 2: Two beds are processing feed (adsorption step), namely Bed 1 and Bed 6. Thus, it follows that valves 011, 012, 061 and 062 are open. Bed 5 and Bed 2 are continuing in equalization steps (E1)-(E1'), valves 057, 027, 028 are open and valve 058 is used to control the rate. Bed 4 and Bed 3 are undergoing (E3/BD1)-(E3') steps (i.e., overlapping low pressure equalization step and blowdown—(BD1). The duration of this lowest pressure equalization and blow down step (i.e., E3/BD1) is less than 15% of the feed time. Valves 045, 035, 038 are open and valve 048 is used to control the flow rate of gas to Bed 3. At the same time, Bed 4 is blown down through valve 044 and (BD1) step gas is directed towards the surge drum via manifold number 4.

Step No. 3: Two beds are processing feed (adsorption step), namely Bed 1 and Bed 6. Thus, it follows valves 011, 012, 061 and 062 will be open. Bed 2 is in the product pressurization step (PP). Valves 027 and 028 are open while valve 007 controls the rate of this step. Bed 5 and Bed 3 are in communication executing (E2)-(E2') steps, valves 055, 035, 038 are open and valve 058 is used to control the rate. Bed 4 is in the blowdown step, when the bed is counter-currently depressurized and its content is released to the surge drum through valve 044 and manifold number 4.

The performance for the 6-2-3 PSA cycle was obtained via mathematical modeling of hydrogen PSA processes. The results are summarized in Table 7. The model assumed following feed gas composition for all cycles: 73.87% hydrogen, 0.23% nitrogen, 3.31% carbon monoxide, 16.37% carbon dioxide, 5.94% methane and 0.3% water. The feed gas temperature was 100° F. and feed gas pressure was 360 Psig. The configuration of vessels and adsorbents used were exactly same as those considered for single feed cycles (i.e., See Table 5).

TABLE 7

Dual feed six bed $H_2$ PSA cycles and corresponding process performance

| | 6-2-2 | 6-2-3 |
|---|---|---|
| Cycle Time [min] | 10.1 | 9.8 |
| [$t_1$, $t_2$, $t_3$] [sec] | [56, 45, 0] | [50, 15, 33] |
| High Pressure [Psig] | 360 | 360 |
| Low Pressure [Psig] | 5.0 | 5.0 |
| Temperature [K] | 310 | 310 |
| Bed ID [ft] | 12.5 | 12.5 |
| Feed Rate [MMSCFD] | 77.3 | 77.3 |
| $H_2$ Product Rate [MMSCFD] | 48.8 | 49.4 |
| Total BSF [lbs/TPD $H_2$] | 4,639 | 4,583 |
| $H_2$ Purity [%] | 99.999 | 99.999 |
| $H_2$ Recovery [%] | 85.0 | 86.0 |

Note 1: MMSCFD represents million standard cubic feet per day of gas where assumed standard conditions are 1 atmosphere pressure and temperature 70° F.
Note 2: 1 Psig is a unit of pressure corresponding to 6894.757 Pascal; 1 lbs is a mass unit corresponding to 0.4535924 kg; K correspond to SI units for temperature of 1 Kelvin; ft represents distance 1 feet equal to 0.3048 meters.
Note 3: TPD $H_2$ represents tons (2000 lbs) of hydrogen per day
Note 4: BSF (bed size factor) is the ratio of total mass of adsorbents in all beds and daily production of hydrogen in tons per days (see Note 3)
Note 5: The 6-2-2 PSA cycle has been modified for the purposes of the simulation to include the adsorbent layering of the present invention. This provides a one-to-one comparison of the cycles.

The simulation results show that the benefit from new 6-2-3 PSA cycle is one additional point in hydrogen recovery. Thus, in both cycles reported in Table 7, the adsorbent layering of the present invention has been incorporated into the cycles. Accordingly, the performance of 6-2-2 cycle in Table 7 does not correspond to prior art performance. The recovery of prior art $H_2$ PSA process using 6-2-2 cycle without the advanced layering of the adsorbents is the range of 82 to 83%.

The major advantage of 6-2-3 cycle versus 6-1-4 cycle is the lower bed size factor (BSF). The BSF is 5618 lbs/TPDH$_2$ for the 6-1-4 PSA cycle (Table 5) and 4583 lbs/TPDH2 for the 6-2-3 PSA cycle (Table 7), respectively. As a result, the 6-2-3 PSA cycle can produce a greater quantity of hydrogen using smaller amount of adsorbents.

While the invention has been described in detail with reference to specific embodiment thereof, it will become apparent to one skilled in the art that various changes and modifications can be made, and equivalents employed, without departing from the scope of the appended claims.

What is claimed is:

1. A pressure swing adsorption process for separating a pressurized supply feed gas containing one or more strongly absorbable component from at least one less strongly absorbable product gas component in a six bed adsorbent system to produce a continuous stream of product gas enriched in the less strongly absorbable component and a stream of offgas that is enriched in the strongly absorbable components, wherein the duration of lowest pressure equalization down and first blowdown step is less than 15% of the teed time, and the process cycle has at least eighteen steps including (bur bed-to-bed equalization steps.

2. A pressure swing adsorption process of claim 1 in accordance to following cycle chart:

| Bed# | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| | | | | | | | | | | | | | | | | | | Step: |
| 1 | A1 | A2/PP1 | A3/PP2 | E1 | E2 | E2 | E3 | PPG | E4/BD1 | BD2 | PG | E4' | E3' | E2' | E2' | E1' | PP1 | PP2 |
| 2 | E1' | PP1 | PP2 | A1 | A2/PP1 | A3/PP2 | E1 | E2 | E2 | E3 | PPG | E4/BD1 | BD2 | PG | E4' | E3' | E2' | E2' |
| 3 | E3' | E2' | E2' | E1' | PP1 | PP2 | A1 | A2/PP1 | A3/PP2 | E1 | E2 | E2 | E3 | PPG | E4/BD1 | BD2 | PG | E4' |
| 4 | BD2 | PG | E4' | E3' | E2' | E2' | E1' | PP1 | PP2 | A1 | A2/PP1 | A3/PP2 | E1 | E2 | E2 | E3 | PPG | E4/BD1 |
| 5 | E3 | PPG | E4/BD1 | BD2 | PG | E4' | E3' | E2' | E2' | E1' | PP1 | PP2 | A1 | A2/PP1 | A3/PP2 | E1 | E2 | E2 |
| 6 | E1 | E2 | E2 | E3 | PPG | E4/BD1 | BD2 | PG | E4' | E3' | E2' | E2' | E1' | PP1 | PP2 | A1 | A2/PP1 | A3/PP2 | wherein:
A1 = First Adsorption Step
A2/PP1 = Second Adsorption Step/First Product Pressurization
A3/PP2 = Third Adsorption Step/Second Product Pressurization
E1 = First Equalization Down
E2 = Second Equalization Down
E3 = Third Equalization Down
PPG = Provide Purge Gas
E4/BD1 = Fourth Equalization Down/First Blowdown
BD2 = Second Blowdown
PG = Purge
E4' = Equalization Up (using gas from E4 step)
E3' = Equalization Up (using gas from E3 step)
E2' = Equalization Up (using gas from E2 step)
E1' = Equalization Up (using gas from E1 step)
PP1 = First Product Pressurization
PP2 = Second Product Pressurization.

3. The pressure swing adsorption process of claim 1, wherein the six bed system is in turndown mode with five beds online, where the process cycle has fifteen steps including three bed-to-bed equalizations steps, white one of the beds is in production.

4. The pressure swing adsorption process of claim 1, wherein said less strongly adsorbable product gas is hydrogen.

5. The pressure swing adsorption process of claim 1, wherein the supply feed gas contains one or more strongly adsorbable component selected from the group consisting of hydrocarbons, carbon dioxide, carbon monoxide, argon, nitrogen and water vapor.

6. The pressure swing adsorption process of claim 1, wherein each adsorbent bed contains alumina, carbon and zeolite material configured in layers in this particular order.

7. The pressure swing adsorption process of claim 6, where the carbon and zeolite layers are each subdivided into two layers with different particle size.

8. The pressure swing adsorption process of claim 7, where the first of the subdivided carbon layers encountered by the supply feed gas has a particle size of about 0.5 to 1.5 mm and an affinity for the carbon dioxide impurity.

9. The pressure swing adsorption process of claim 7, where the second of the subdivided carbon layers encountered by the supply feed gas has a particle size of about 2.0 to 3.0 mm and an affinity (or the methane impurities.

10. The pressure swing adsorption process of claim 7, where the first of the subdivided zeolite layers encountered by the supply feed gas has a particle size of about 0.5 to 2.0 mm and an affinity for the carbon monoxide impurity.

11. The pressure swing adsorption process of claim 7, where the second of the subdivided zeolite layers encountered by the supply feed gas has a particle size of about 2.0 to 3.0 mm and an affinity for the nitrogen impurity.

12. A pressure swing adsorption process for separating a pressurized supply feed gas containing one or more strongly adsorbable component from at least one less strongly adsorbable product gas component in a five bed adsorbent system to produce a continuous stream of product gas enriched in the less strongly adsorbable component and a stream of offgas that is enriched in the strongly adsorbable components, wherein the duration of lowest pressure equalization down and first blow down step is less than 15% of the feed time, and the process cycle has at least fifteen steps including three bed-to-bed equalization steps.

13. A pressure swing adsorption process of claim 12 in accordance to following cycle chart:

| Bed# | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | | | | | | | | | | | | | | | Step: |
| 1 | A1 | A2 | A3/PP1 | E1 | E1 | E2 | PPG | E3/BD1 | BD2 | PG | E3' | E2' | E1' | E1' | PP1 |
| 2 | E1' | E1' | PP1 | A1 | A2 | A3/PP1 | E1 | E1 | E2 | PPG | E3/BD1 | BD2 | PG | E3' | E2' |
| 3 | PG | E3' | E2' | E1' | E1' | PP1 | A1 | A2 | A3/PP1 | E1 | E1 | E2 | PPG | E3/BD1 | BD2 |
| 4 | PPG | E3/BD1 | BD2 | PG | E3' | E2' | E1' | E1' | PP1 | A1 | A2 | A3/PP1 | E1 | E1 | E2 |

-continued

|      | Step: | | | | | | | | | | | | | | |
|------|----|----|----|-----|--------|-----|----|-----|----|-----|-----|-----|-----|-----|--------|
| Bed# | 1  | 2  | 3  | 4   | 5      | 6   | 7  | 8   | 9  | 10  | 11  | 12  | 13  | 14  | 15     |
| 5    | E1 | E1 | E2 | PPG | E3/BD1 | BD2 | PG | E3' | E2'| E1' | E1' | PP1 | A1  | A2  | A3/PP1 | where:
A1 = First Adsorption Step
A2 = Second Adsorption Step
A3/PP2 = Third Adsorption Step/Second Product Pressurization
E1 = First Equalization Down
E2 = Second Equalization Down
PPG = Provide Purge Gas
E3/BD1 = Third Equalization Down/First Blowdown
BD2 = Second Blowdown
PG = Purge
E3' = Equalization Up (using gas from E3 step)
E2' = Equalization Up (using gas from E2 step)
E1' = Equalization Up (using gas from E1 step)
PP1 = First Product Pressurization.

14. A pressure swing adsorption process for separating a pressurized supply feed gas containing one or more strongly adsorbable component from at least one less strongly absorbable product gas in a six bed adsorbent system where the process cycle has eighteen steps including three bed-to-bed equalizations steps, while two of the beds are in production, where the duration of lowest pressure equalization down and first blowdown step is less than 15% of the feed time, in accordance to following cycle chart:

|      | Step: | | | | | | | | | | | | | | | | | |
|------|-----|-----|-------|-----|--------|-------|-------|-------|-------|--------|--------|-------|--------|--------|-------|--------|--------|-------|
| Bed# | 1   | 2   | 3     | 4   | 5      | 6     | 7     | 8     | 9     | 10     | 11     | 12    | 13     | 14     | 15    | 16     | 17     | 18    |
| 1    | A1  | A2  | A3    | A4  | A5     | A6/PP | E1    | E1    | E2    | PPG    | E3/BD1 | BD2   | PG     | E3'    | E2'   | E1'    | E1'    | PP    |
| 2    | E1' | E1' | PP    | A1  | A2     | A3    | A4    | A5    | A6/PP | E1     | E1     | E2    | PPG    | E3/BD1 | BD2   | PG     | E3'    | E2'   |
| 3    | PG  | E3' | E2'   | E1' | E1'    | PP    | A1    | A2    | A3    | A4     | A5     | A6/PP | E1     | E1     | E2    | PPG    | E3/BD1 | BD2   |
| 4    | PPG | E3/BD1 | BD2 | PG  | E3'    | E2'   | E1'   | E1'   | PP    | A1     | A2     | A3    | A4     | A5     | A6/PP | E1     | E1     | E2    |
| 5    | E1  | E1  | E2    | PPG | E3/BD1 | BD2   | PG    | E3'   | E2'   | E1'    | E1'    | PP    | A1     | A2     | A3    | A4     | A5     | A6/PP |
| 6    | A4  | A5  | A6/PP | E1  | E1     | E2    | PPG   | E3/BD1| BD2   | PG     | E3'    | E2'   | E1'    | E1'    | PP    | A1     | A2     | A3    | wherein:
A1 = First Adsorption Step
A2 = Second Adsorption Step
A3 = Third Adsorption Step
A4 = Fourth Adsorption Step
A5 = Fifth Adsorption Step
A6/PP = Sixth Adsorption Step/Product Pressurization
E1 = First Equalization Down
E2 = Second Equalization Down
PPG = Provide Purge Gas
E3/BD1 = Third Equalization Down/First Blowdown
BD2 = Second Blowdown
PG = Purge
E3' = Equalization Up (using gas from E3 step)
E2' = Equalization Up (using gas from E2 step)
E1' = Equalization Up (using gas from E1 step)
PP = Product Pressurization.

\* \* \* \* \*